US008898103B2

(12) United States Patent
Menday

(10) Patent No.: US 8,898,103 B2
(45) Date of Patent: Nov. 25, 2014

(54) METHOD AND DEVICE FOR GENERATING AN ONTOLOGY DOCUMENT

(75) Inventor: Roger Menday, Guildford Surrey (GB)

(73) Assignee: Fujitsu Limited, Kawasaki (JP)

( * ) Notice: Subject to any disclaimer, the term of this patent is extended or adjusted under 35 U.S.C. 154(b) by 549 days.

(21) Appl. No.: 13/182,882

(22) Filed: Jul. 14, 2011

(65) Prior Publication Data

US 2011/0271176 A1 Nov. 3, 2011

Related U.S. Application Data

(63) Continuation of application No. 13/095,029, filed on Apr. 27, 2011, now abandoned.

(30) Foreign Application Priority Data

Apr. 30, 2010 (EP) ..................................... 10161690

(51) Int. Cl.
*G06F 17/21* (2006.01)
*G06F 17/27* (2006.01)
*G06F 17/30* (2006.01)

(52) U.S. Cl.
CPC ................................ *G06F 17/30734* (2013.01)
USPC .............. 706/55; 715/231; 715/234; 707/794

(58) Field of Classification Search
None
See application file for complete search history.

(56) References Cited

U.S. PATENT DOCUMENTS

| 8,065,655 | B1 * | 11/2011 | Deo et al. ...................... 717/106 |
| 2004/0117173 | A1 | 6/2004 | Ford et al. |
| 2008/0228812 | A1 | 9/2008 | Oglesby et al. |
| 2009/0112903 | A1 | 4/2009 | Liang et al. |
| 2010/0228782 | A1 * | 9/2010 | Rao et al. ...................... 707/794 |

FOREIGN PATENT DOCUMENTS

| JP | 2006-510968 | 3/2006 |
| JP | 2008-262551 | 10/2008 |
| JP | 2009-87339 | 4/2009 |

OTHER PUBLICATIONS

Pedrinaci, C. et al. On the Integration of Services with the Web of Data. Association for the Advancement of Artificial Intelligence (Mar. 2010).*
European Search Report issued Oct. 27, 2010 in corresponding European Application No. 101616920.2.

(Continued)

*Primary Examiner* — Kakali Chaki
*Assistant Examiner* — Eric Nilsson
(74) *Attorney, Agent, or Firm* — Staas & Halsey LLP

(57) ABSTRACT

A computer-implemented method is provided for generating an ontology document, the method comprising inputting a domain description including information about items in the domain and relationships between the items; accessing a data structure and an operation structure, wherein the data structure is a domain-independent model of items and relationships between items, the data structure comprising at least progenitor items each able to contain only progeny items created by the progenitor item as a consequence of the progenitor item accepting an operation from the operation structure invoked against it, the operation structure also being domain-independent; and applying the data structure and the operation structure to the domain description to generate an ontology document for use in producing a software artifact.

26 Claims, 12 Drawing Sheets

(56) References Cited

OTHER PUBLICATIONS

C. Pedrinaci, et al., "Services and the Web of Data: An Unexploited symbiosis," Proccedings of the 2010 AAAI Spring Symposium Series: Mar. 22-24, 2010.

P Jain, et al., "Linked Data is merely More Data," Proceedings of the 2010 AAAI Spring Symposium Series: Mar. 22-24, 2010.

W. Vambenepe, "REST in Practice for IT and Cloud Management (Part 3: Wrap-UP)," William Vambenepe's Blog 'IT Management in a Changing IT World,' Dec. 10, 2009.

W. Vambenepe, "Review of Fujitsu's IaaS Cloud Submission to DMTF," William Vambenepe's Blog 'IT Management in a Changing IT World,' Nov. 19, 2009.

U.S. Appl. No. 13/095,029, filed Apr. 27, 2011, Roger Menday, Fujitsu Limited.

Japanese Office Action mailed Sep. 16, 2014 in corresponding Japanese Patent Application No. 2011-101835.

* cited by examiner

Postie
progeny of Posties

350a
'URI template (this is a SUGGESTION only)
    /Posties
        /{Postie}'

'Operations
GET <item url='..' class='Postie'>
            <date> dateTime </date>
            <text> string </text>
    </item>

DELETE'

'Properties (dot indicates read-only)
    date•       dateTime
    text        string'

FIG. 8A

Posties
progenitor of Postie

350b
'URI template (this is a SUGGESTION only)
/Posties'

'Operations
GET  <item url='..' class='Posties'>
            <postie url='..' class='Postie' />
    </item>

POST   creates a Postie child resource inside this collection
    <item class='Postie'>
        <text> string </text>
    </item>'

'Properties (dot indicates read-only)
Progenitor of
    postie  Postie'

FIG. 8B

METHOD AND DEVICE FOR GENERATING AN ONTOLOGY DOCUMENT

CROSS REFERENCE TO RELATED APPLICATIONS

This application is a continuation of U.S. Ser. No. 13/095,029, filed on Apr. 27, 2011, now abandoned which claims priority from European Patent Application No. 10161690.2 filed on Apr. 30, 2010 in the European Intellectual Property Office, the entire disclosures of which are incorporated herein by reference.

Recent progress towards a 'web for machines' and an aspect web 2.0 means that many websites or domains offer access to exposed data and services via an interface such as an API (Application Programming Interface). The consumers of the resulting web applications are machines, rather than humans driving an application through a web browser.

APIs and API support has also enabled the combination of data and services from more than one source to create derived services, mashups and desktop versions of web applications. Additionally, HTTP-based APIs have evolved as a means to support computing requirements (and not primarily to complement an existing website), for example, APIs referred to as Infrastructure-as-a-Service (IaaS) Cloud APIs. Infrastructure-as-a-Service is a mechanism by which a client computer or client network can access external or third-party computing infrastructure via the web for the performance of, for instance, processing and storage tasks.

REST (Representational State Transfer) is an architectural style which governs the proper behaviour of participants in the web for machines. REST sets out constraints for system architectures to which conforming is described as being 'RESTful', the first of which is that the architecture has a client-server arrangement, with clients being separated from servers by a uniform interface. There are four guiding principles of the interface between client and server, and an interface developed in accordance with these principles can be described as 'RESTful'. For example, an API can be written in accordance with the REST guiding principles for interfaces, and would hence be described as a 'RESTful API'. HTTP as a protocol can be used in a RESTful manner, and RESTful HTTP is suitable for the web for machines. RESTful APIs are popular for a number of key reasons: there is simplicity of the basic protocol built on a proven foundation with solid architectural principles, and the result is approachable and usable by web developers.

In brief, the REST architectural style describes six constraints (one of the six is optional) on a system architecture are as follows:
the architecture should be client-server;
the client and server are separated by a uniform interface;
the architecture is stateless, meaning that no client context is stored on the server between requests from the client—each request contains all of the information necessary to service the request, with state information held in the client itself;
clients are able to cache responses;
(optional) functionality may be extended by a server transferring logic to a client which the client can execute.

The guiding principles for the uniform interface are briefly summarised below:
individual resources in the domain can be identified in requests from the client (this would be via URIs (Universal Resource Identifiers) in a web-based system). The resources themselves are separate entities from the representations returned to the client;
the representation of a resource held by a client is sufficient to give the client enough information to modify or delete the resource on the server (permissions allowing);
each message between client and server contains enough information for the recipient to process the message;
the representation of a resource provided from the server to the client should include hypertext links to related resources.

A positive aspect of the REST architectural style is that it links well with information models, an information model being a formalised description of items in a domain and relationships between those items. The operations allowed in a RESTful API are constrained (fixed), this avoids the unwanted side effects of poor programming behaviour which would ordinarily lead to problems in linking an interface with an information model.

In fact, a RESTful API for a particular domain may be defined purely in terms of the information model for the domain, and by how this model then appears inside different data formats, the data formats being wire level (low level or implementation level) manifestations of the information model. Unfortunately, APIs currently in use show disparities regarding their approach to information modelling, how this appears inside data formats, and how the semantics of HTTP are brought to use in the specific domain of the API(s) in question. This lack of consistency is problematic since potential benefits of a RESTful protocols are lost, for example, the potential for re-usable toolkits (eg standard code) and generic client agents (equivalent to a browser).

The information model for a particular domain may be captured in an ontology document presented in, for example, the OWL (Web Ontology Language) format. An ontology document can then be used as the basis for an API or an interface specification.

Currently, the approach taken by a service developer writing an API, and potentially following it up with a particular implementation of the API, may be to define a modified or adapted version of a language specific to the domain for which the API is being produced and suitable for a specific data format, for example the language may be based on JSON or XML. This data format-specific approach is problematic because different data formats operate in accordance with different processing rules. The realisation of a generic client able to access all APIs using a common set of processing rules becomes impossible, as custom code is required for each domain and each data format.

Embodiments of the present invention provide a computer-implemented method for generating an ontology document indicating a structure of classes of items within a domain, which items belong to which class, and which operations each class supports, the method comprising inputting a domain description including information about items in the domain and relationships between the items; accessing a data structure and an operation structure, wherein the data structure is a domain-independent model of items and relationships between items for characterising items described in the domain description into classes, the data structure comprising at least progenitor items as a class of items each able to contain only progeny items created by the progenitor item as a consequence of the progenitor item accepting an operation from the operation structure invoked against it, and the operation structure including a domain-independent list of operations which, when applied to a domain description, define processing rules for the classes of items; and applying the data structure and the operation structure to the domain description to generate an ontology document for use in producing a software artefact.

The inventors of the present invention have come to the surprising realisation that mere automation of a programmer's activity is not sufficient to improve runtime reliability of interfaces between a client and a server, and that a radical reformulation of the approach to producing ontology documents modelling the domain can be used for this purpose. The method of the present invention embodies this new approach, applying a core domain-independent data structure and operation structure to a domain description to generate an ontology document. Breaking up the concept of an ontology into domain-dependent and domain-independent structures and descriptions ensures a consistency of approach across domains, and allows assumptions to be made in the domain-independent structures which can be applied to an ontology document for any domain.

An ontology document is not restricted by format, and may include information indicating the structure of classes of items within a domain, which individual items belong to which class, and which operations, for example, which operations each class supports. An ontology document may be written in OWL (Web Ontology Language). Alternatively, the ontology document may not be formally presented as a single document, but may be any collection of pieces of information contributing to a representation of the ontology of a domain.

The ontology document produced by methods embodying the present invention is suitable for use in producing software artefacts. A software artefact is either a computer program, or piece of code for a computer program, or a protocol or specification which can be directly used for producing software code or computer programs. A software artefact may include one or more of the following: a client application, an API, a client implementation, a server-side implementation, a web page, an application skeleton, or in certain embodiments, an interface specification.

The term 'interface specification' may include a protocol for accessing services and exposed data in a domain. Data and services may be exposed insofar as representations of items and resources in the domain are available to client applications or peer server applications acting in the client role re server-side mashups. Alternatively or additionally, data and services in a domain or complete portfolio services may be exposed insofar as they are manageable by a client application. Depending on the embodiment, the term 'interface specification' may include an association with a particular domain, but does not associate the interface with any particular client application or restrict the interface to a particular implementation of the specification (such as an API). An interface specification may for example include any or all of the following:

URI templates;
data formats including classes of items;
links between classes, the links being categorised into types contains, accepts, and others;
allowable HTTP methods for each class;
which data objects are editable on each class;
the representation of instances of a class returned when an HTTP GET operation is performed on the instance;
the entity which is capable of creating a new instance of each class, which may be via a POST operation to a valid receiver of the POST request, this may also include generic instructions to the server side on how to process a create operation for instances of each class, including which child resources in a container a client would expect to be created;
which classes are manageable.

The term 'interface' may include an interface between a client and a server.

The term 'instance of a class' may include an item which exists in the domain at runtime and conforms to the template for that class, the template being defined by applying the data structure and operation structure to the domain description, so each instance 'belongs' to a class. Similarly, an 'instance of a subclass' may include an instance which belongs to the subclass and to the class from which the subclass stems. A resource may include a generic class of item which has links to other resources, has fields, and can optionally be deleted.

The domain description may at least include information about items in the domain and relationships between the items, and may include a domain ontology. In some embodiments, the domain description contains sufficient information presented in a manner which allows an ontology document to be generated containing a complete or substantially complete representation of available classes in the domain and the methods they support. The ontology document will therefore allow at least a partial interface specification to be derived (inferred, deduced or to surface) as a software artefact from the ontology document. For example, the domain description may be presented in such a way that the containment hierarchy of resources belonging to each class and subclass present in the domain description can be represented in the ontology document.

The term 'data structure', referring to the data structure optionally provided within the processing engine, or which is accessed in generating the ontology document, may include a domain-independent model of items and relationships between items, and could be considered to include a domain-independent data model or a core data model. The term 'data structure' may include 'data structure ontology'. The data structure may provide core, domain-independent classes such as Postable, Collection, Shareable, State, Deletable, and Manageable. When the data structure is applied to the data description in the processing engine the resources in the domain can be characterised as instances of domain-independent classes, or sub-classes stemming from those domain-independent classes and hence inheriting properties of the domain-independent classes.

The term 'operation structure', referring to the operation structure provided within the processing engine, or which is accessed in generating the ontology document, may include a domain-independent list of operations which, when they are applied to the domain description, define processing rules to tell the server how to handle operations performed on resources belonging to certain classes, wherein it is possible that these processing rules will vary based on a state of the resource. The term 'operation structure' may include 'operational ontology'. The operation structure could be considered to be an operation model.

The operation structure and data structure together can be referred to as a domain-independent information model. Once the operation structure and data structure have been applied to the domain description, a domain-specific information model, or ontology document, may be obtained, and this is suitable for forming the basis of a software artefact such as an interface specification.

The term 'resource' may include items of the class 'Resource', a generic class of item which has links to other resources, has fields, and can optionally be deleted. The term 'container' may include items of the class 'Container', a class which extends (is a subclass of) the class 'Resource', and is able to contain other resources. A delete operation on a Container removes it and all resources contained therein. The term 'progenitor' may include items of the class 'Progenitor', a class which extends (is a subclass of) the class Container, and is able to create Progeny items, which are themselves a subclass of Resource, within an instance of Progenitor, for example as a consequence of a 'post' operation invoked against (performed on) an instance of the Progenitor class. The class Progenitor is part of the data structure and is a domain-independent concept that can be applied to a domain description to identify through inference and other techniques which resources in a domain can be classified as progenitors when producing an application specification.

Advantageously, producing an ontology document based on a data structure including progenitor items results in an ontology document which can form the basis of a software artefact (such as an application specification) in which problems resulting from misuse of operational terminology is avoided. For example, misuse of HTTP operations GET and PUT can lead to APIs or other software artefacts which do not follow common processing rules and hence require specialist client applications to access exposed data and services in the domain for which the API is produced. The behaviour of a progenitor item (part of the data structure) in response to a POST operation (part of the operation structure) is self-evident from the nature of the progenitor item itself (being a container in which new items are added by creation). The parts of the domain now classified as progenitors and having well-defined behaviour in response to the POST operation are parts of the domain which would have been susceptible to misuse of the GET and PUT operations by a developer creating an API for the domain. Runtime reliability of software artefacts such as interfaces implementing an interface specification based on an ontology document produced via the method of the present invention is improved in relation to prior interfaces.

Optionally, in methods embodying the present invention, the domain description is input to a processing engine, the data structure and operation structure are accessed by the processing engine, the data structure and operation structure are applied to the domain description in the processing engine, and the ontology document is generated by the processing engine.

The processing engine may be realised as a piece of software which, when run on a computing device having a processor, causes the computing device to perform the steps of accepting the domain description as an input, applying the data structure and operation structure to the domain description, and generating the interface specification as an output. Alternatively, the processing engine may be a computing device operable to accept the domain description as an input and, having applied the data structure and operation structure to the domain description, to generate the interface specification as an output. Alternatively, the processing engine in this aspect may be capable of performing as the constrained editor as described in more detail hereinafter.

Advantageously, providing a method whereby a processing engine is used to apply the data structure and operation structure to a domain description can improve consistency of approach in producing ontology documents.

As an implementation detail which may vary between embodiments, each instance of progenitor item is only able to contain progeny items that are instances of a particular class of item.

The membership of a progenitor item may be further restricted to particular sub-classes of a certain class, or individuals within a class or subclass. Individuals in this sense being types of items within a certain class. Advantageously, restricting the membership of a progenitor item in this way simplifies the processing rules that are required to handle the progenitor item so that the ontology document provides a representation of a domain in which the processing rules to be used in running a software artefact such as an interface implementing an interface specification based on the ontology document are simple and well-defined.

Methods embodying the present invention may additionally include generating in a processing engine, and outputting from the processing engine, a URI template in accordance with the ontology document, whereby the URI template can be used to ensure that each resource in the domain at runtime is dereferencable via an HTTP URI.

While formally opaque, URI (Universal Resource Identifier) templates are useful since they ensure that URIs used in a software artefact such as an implementation of an interface specification based on the ontology document reflect the containment hierarchy captured in the ontology document and derived from the domain description. The processing engine may be the same processing engine as previously described. It may be a constrained editor with additional functionality able to function as a combination of constrained editor and transformation engine as described in more detail hereinafter.

In certain embodiments, a full set of URI templates will be generated, so that a URI template for each class of item in the domain is made available.

Optionally, the ontology document defines a class of manageable container, instances of the manageable container class containing a states progenitor item, the states progenitor item being a progenitor item able to contain only progeny items that are instances of a state class of items used for indicating one of a predefined list of operating states of the class of manageable container.

An ontology document defining manageable containers in this way provides a mechanism by which a client can manage the state of items in the domain by posting simple data objects (new state items) to the states progenitor item.

For example, a progenitor 'servers' in a virtual system domain may be able to create a progeny item 'server' as a consequence of a client performing a POST operation. In this case, the acceptance constraints are that for the operation POST, a progeny item server is created, and this remains true regardless of environmental variables. In another example, a manageable resource may have a progenitor 'states', able to create a new state resource as a progeny item when a POST operation specifying a subclass of the class State is invoked against it. It may be that when the states progenitor contains the state 'off', it will only accept a POST operation specifying the resource 'on', which is a subclass of the class State. By making the constraints available to a client tool the interface specification effectively provides a way in which the acceptance constraints can be advertised to a client tool, this may be in response to a query or otherwise. For example, a client tool may identify that a resource in the domain being accessed via an API is manageable, and submit a query to the server to find out what state items can be created in a states progenitor to modify the state of the manageable resource.

As set out above, the constrained editor may alternatively be automated as a function of a processing engine.

Optionally, the data structure and operation structure are accessed via a constrained editor, the constrained editor being an editing environment for constraining the user into inputting the domain description in such a way that the data structure and operation structure are applied to the domain description.

The constrained editor may include a graphical interface to reduce the technical expertise required to produce an ontology document. The constrained editor, which when realised as a piece of software may itself have been derived using the methods described herein, may constrain the actions of a user by allowing an ontology representation to be built up in a graphical format, such as a graph or diagram or map, in which at any stage, the only allowable additions to the ontology representation are those which are consistent with the data structure and operation structure. Furthermore, the constrained editor may review the ontology representation to ensure consistency with the data structure and operation structure, whether continually, intermittently, or at the request of the user. Inputting may include entering domain description information to a computer terminal hosting the constrained editor (or the constrained editor may be a web application or device), and may include producing the domain description.

Embodiments may be provided in which a software artefact produced using the ontology document is consistent with principles of interfaces in the REST architectural style. The REST architectural style for distributed hypermedia systems is favoured in web development for its clear division of the role of client and server which governs the proper behaviour of participants in the web. Whilst the REST architectural style is desirable, producing interfaces between client and server which are consistent with the style is time-consuming and error-prone. The reformulation of approach to deriving an ontology document of the present invention provides a method in which the data structure and operation structure can themselves ensure that the ontology document is suitable for use in generating an interface specification resulting in interfaces compliant with the REST architectural style, or other RESTful software artefacts. The user need not be aware of the REST constraints and style, but can generate an ontology document for use in producing a REST-compliant specification merely by adhering to the data structure and operation structure.

By making certain assumptions at the domain-independent level in the data structure and operation structure, the assumptions (such as processing rules for combinations of a certain operation performed on a certain class of item) carry across all software artefacts that have been created using the method of the present invention. The data structure and operation structure define allowable operations and a way of representing resources within a domain that is consistent with the REST architecture style and hence results in RESTful APIs being produced. The method according to the present invention provides a systematic approach to the process of evolving and producing RESTful APIs, RESTful software artefacts, and interface specifications that ensures consistency with respect to usage of data formats and interaction semantics.

Embodiments may further comprise, in a processing engine, applying a set of rules based on the data structure and the operation structure to the ontology document to generate a software artefact. Based on the content of the ontology document produced using the method of the present invention a set of rules can be applied to infer and derive additional properties and information, such as relationships between items not explicitly stated in the ontology document, in order to produce an interface specification. It may be that the entire process of applying the data structure and operation structure to the domain description also occurs within a processing engine, so that a single-click process enables a user to generate a software artefact from a domain description. An ontology document in this case may be realised as a plurality of pieces of ontology information to which rules are applied in generating a software artefact. Alternatively, it may be that an ontology document capturing the data structure and operation structure is a single entity which is storable and accessible by a user, and to input to a processing engine to generate a software artefact. In this aspect, the processing engine may include a transformation engine, as part of the processing engine previously defined.

Optionally, a method embodying the present invention may be a method comprising in a processing engine, applying a set of rules based on the data structure and the operation structure to an input ontology document to generate a software artefact. The ontology document may be input as a formal OWL document, or may be fed to the processing engine as a plurality of pieces of information representing the ontology of a domain. The ontology document may have been generated according to a method embodying the present invention.

Furthermore, ontology documents and interface specifications generated via a method embodying the present invention, due to the domain-independent structures being applied, can ensure a consistency of approach to dealing with different types of media, so that XML schema for handling representations of resources are not required. It is an additional effect of the methods embodying the present invention that a generic client tool can be used to interface with any domain. That is to say, a client tool for accessing exposed data and services across a range of domains can be realised which does not need specific processing rules for handling representations of resources in each domain. The domain-independent data structure and operation structure is such that a client tool can use generic language, queries, and requests for obtaining information from the domain, and can use generic processing rules for handling representations of resources in the domain.

When the generated software artefact is an interface specification, the interface specification defines an interface according to principles for interfaces in the REST architectural style.

In a particular embodiment, the domain description may be input to a computer terminal by a user, and the data structure and operation structure accessed by a program running on the computer (or being accessed remotely by the computer), and applied to the inputted domain description in a constrained editing environment. An intermediate ontology document in a specified format may then be produced, which can itself be input to a transformation engine (optionally a program run on a computer) operable to apply a set of rules (inference operations and derivation operations) to the ontology document to generate an interface specification or other software artefacts. The intermediate production of a formal ontology document could be omitted, so that the ontology document is not a formal document, but rather the product of having applied the data structure and operation structure to the domain description in a constrained editing environment. An interface specification and other outputs are made available within the constrained editing environment.

Optionally, in embodiments of the present invention, the data structure and the operation structure ensure that the software artefact generated is consistent with principles for interfaces in the REST architectural style.

The benefits of the REST architectural style are well-documented, but the coding of interfaces and interface specifications that comply with the constraints and principles of REST is time-consuming and error-prone. Embodiments of the present invention enable a user to generate an interface specification or documents for use in generating an interface specification using only domain knowledge to produce a domain description. The approach of the present invention does so in a way that user-control and flexibility in operational details for the interface can also be optimised. The domain-independent data structure and operation structure are applied to a domain description in order that an ontology document or interface specification consistent with those structures is generated and the benefits of those structures are inherent in the information model represented in the ontology document. Therefore the user is free to utilise the ontology document or interface specification in a range of applications without compromising the benefits inherent in the fundamental domain independent data structure and operation structure.

As an optional feature, the ontology document may define a class of manageable container, instances of the manageable container class containing a states progenitor item, the states progenitor item being a progenitor item able to contain only progeny items that are instances of a state class of items used for indicating one of a predefined list of operating states of the class of manageable container, so that the state of an instance of the manageable container class at runtime of a software artefact or an implementation of a software artefact is operable to be managed by adding an instance of the state class to the states progenitor item contained by the instance of the manageable container class.

Advantageously, embodiments of the present invention in which the ontology document defines manageable containers as defined above allow a client tool or application to manage the state of items at the server side using simple HTTP or equivalent operations. This approach is compliant with the principles for interfaces in the REST architectural style.

As a further optional feature, the state of the instance of the manageable container class at runtime is indicated by the most recently added instance of the state class to the states progenitor item contained by the instance of the manageable container class, so that the progeny items contained by the states progenitor item are a state history of the instance of the manageable container class.

Managing states in this way has the surprising and desirable effect that a state history is available with no additional processing or storage required. It may be that a list of states in the states progenitor is returned in response to an HTTP GET operation being performed on the states progenitor item. The number of states retained in the states progenitor item may be restricted.

Optionally, instances of the manageable container class are virtual computing systems. Virtual networks and virtual computing systems require state management and this may be from a client tool or client application. Advantageously, in embodiments of the present invention in which a virtual computer system is treated as a manageable container class and classified in this way in the ontology document and resulting interface specification, the client can manage the virtual computing system in a manner compliant with the REST architectural style.

Optionally, the software artefact includes defined acceptance constraints which, at runtime of the software artefact or an implementation of the software artefact, constrain the particular instances of progeny items that can be created by an instance of a progenitor item as a consequence of an operation invoked against it, the acceptance constraints being available to a generic client tool.

It may be desirable to define dynamic acceptance restrictions which a progenitor item can advertise to a client application (the server would return details of some or all acceptance constraints in response to a client request). For example, the next state of a states progenitor item may depend on the current state, so that certain states may follow certain other states, and certain states may be precluded.

Optionally, the domain is a cloud computing environment and the software artefact is an interface specification which can be implemented as an infrastructure as a service API, or the software artefact is an infrastructure as a service API. Cloud computing is internet-based computing. Devices are able to share resources and offer services to one another. Devices and services can be accessed on an on-demand basis, like a public utility. In fact, embodiments of the present invention can also be used to generate a software as a service API, a platform as a service API, and a software as a service API. Specifically, in infrastructure as a service computer infrastructure is provided as a resource available over the internet.

Advantageously, interface specifications and ontology documents generated by methods embodying the present invention can be made to model data in accordance with RDF (Resource Description Framework). RDF is a general method for conceptual description or modelling of information that is implemented in web resources, using a variety of syntax formats. Due to the RDF background of the ontology documents and software artefacts generated by embodiments of the present invention, a generic query function can be added to cloud IaaS APIs (or cloud PaaS APIs) to enable live information regarding environmental and operating conditions within the cloud to be accessed by a client application employing the generic query function at runtime.

The present invention may be embodied as a computing device configured to generate an ontology document indicating a structure of classes of items within a domain, which items belong to which class, and which operation each class supports, the computing device comprising an input module for inputting a domain description including information about items in the domain and relationships between the items; an access module for accessing a data structure and an operation structure, wherein the data structure is a domain-independent model of items and relationships between items for characterising items described in the domain description into classes, the data structure comprising at least progenitor items as a class of items each able to contain only progeny items created by the progenitor item as a consequence of the progenitor item accepting an operation from the operation structure invoked against it, and the operation structure including a domain-independent list of operations which, when applied to a domain description, define processing rules for the classes of items; and a generator for applying the data structure and the operation structure to the domain description to generate an ontology document for use in producing a software artefact. Input module may have the functionality to accept an input, for example, from another program or device or from a user. The computing device may be the constrained editor described elsewhere in this document.

The computer-implemented method for generating an ontology document indicating a structure of classes of items within a domain, which items belong to which class, and which operations each class supports, may comprise, at an input module, inputting a domain description including information about items in the domain and relationships between the items; at an access module, accessing a data structure and an operation structure, wherein the data structure is a domain-independent model of items and relationships between items for characterising items described in the domain description into classes, the data structure comprising at least progenitor items as a class of items each able to contain only progeny items created by the progenitor item as a consequence of the progenitor item accepting an operation from the operation structure invoked against it, and the operation structure including a domain-independent list of operations which, when applied to a domain description, define processing rules for the classes of items; and at a generator, applying the data structure and the operation structure to the domain description to generate an ontology document for use in producing a software artefact. As described above, an input module may have the functionality to accept an input, for example, from another program or device or from a user. An access module may provide a link to a storage, either remote or local, in which the data structure and operation structure are stored. A generator may be a processor constrained to behave in a particular manner by processing rules and instructions, which rules and instructions therefore may also be considered part of the generator.

Figure 4A:
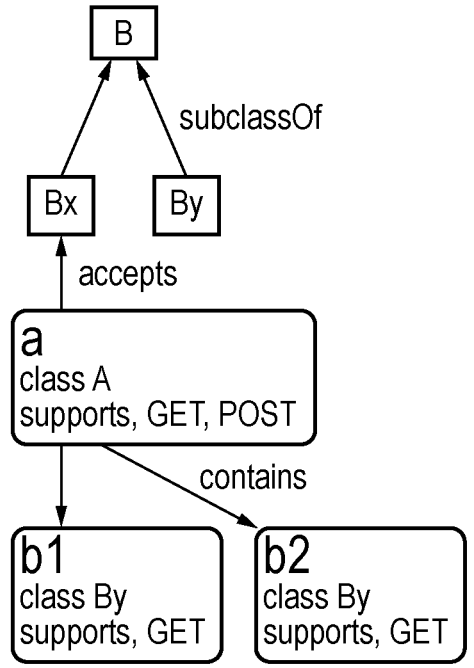
Figure 4B:
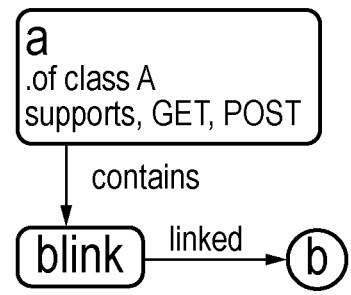
Figure 4C:
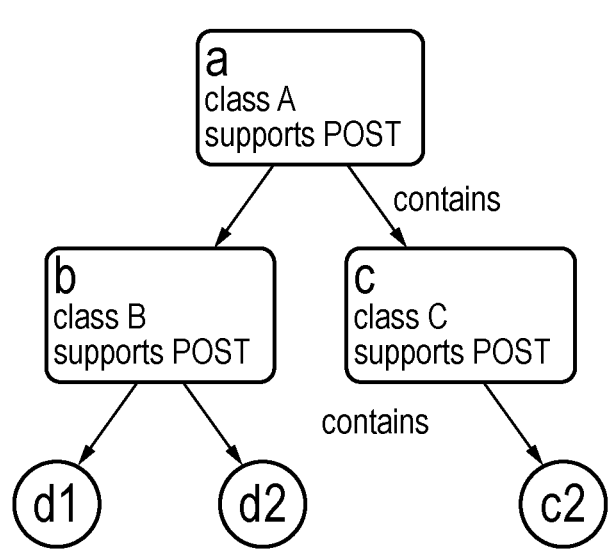
Figure 5A:
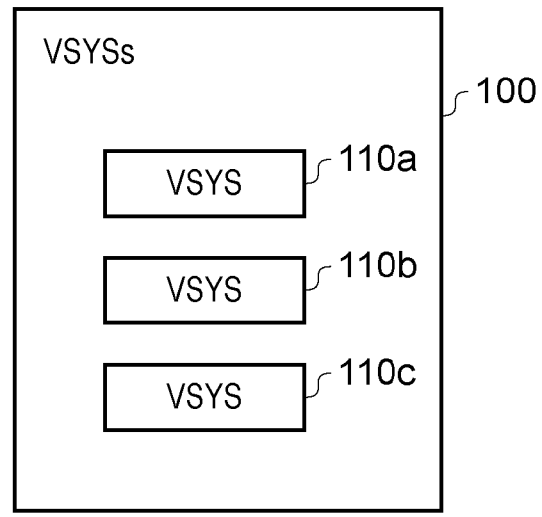
Figure 5B:
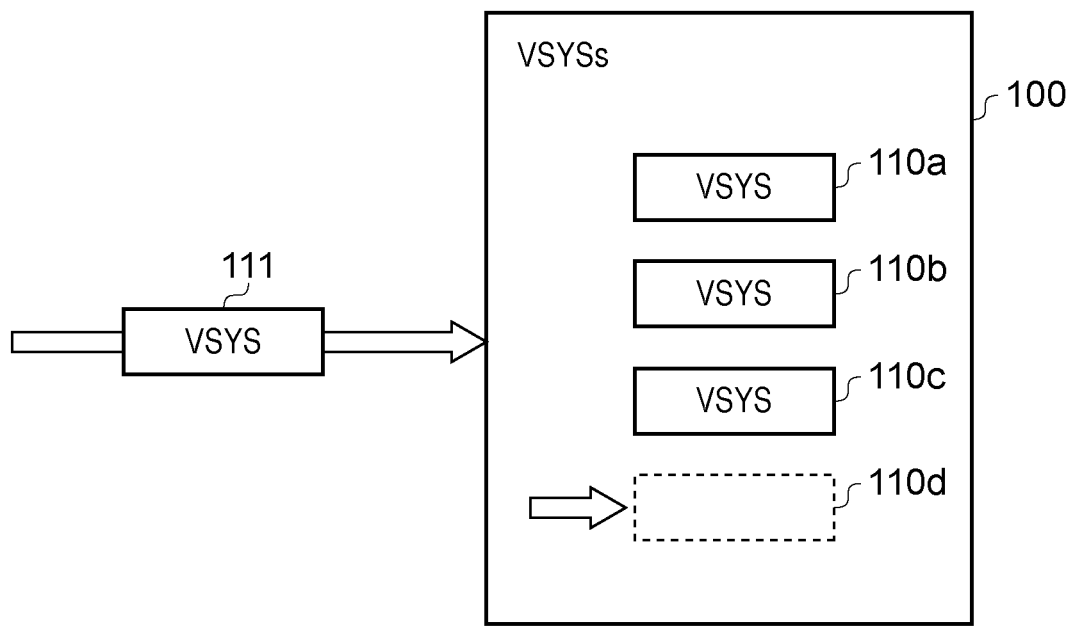
Figure 5C:
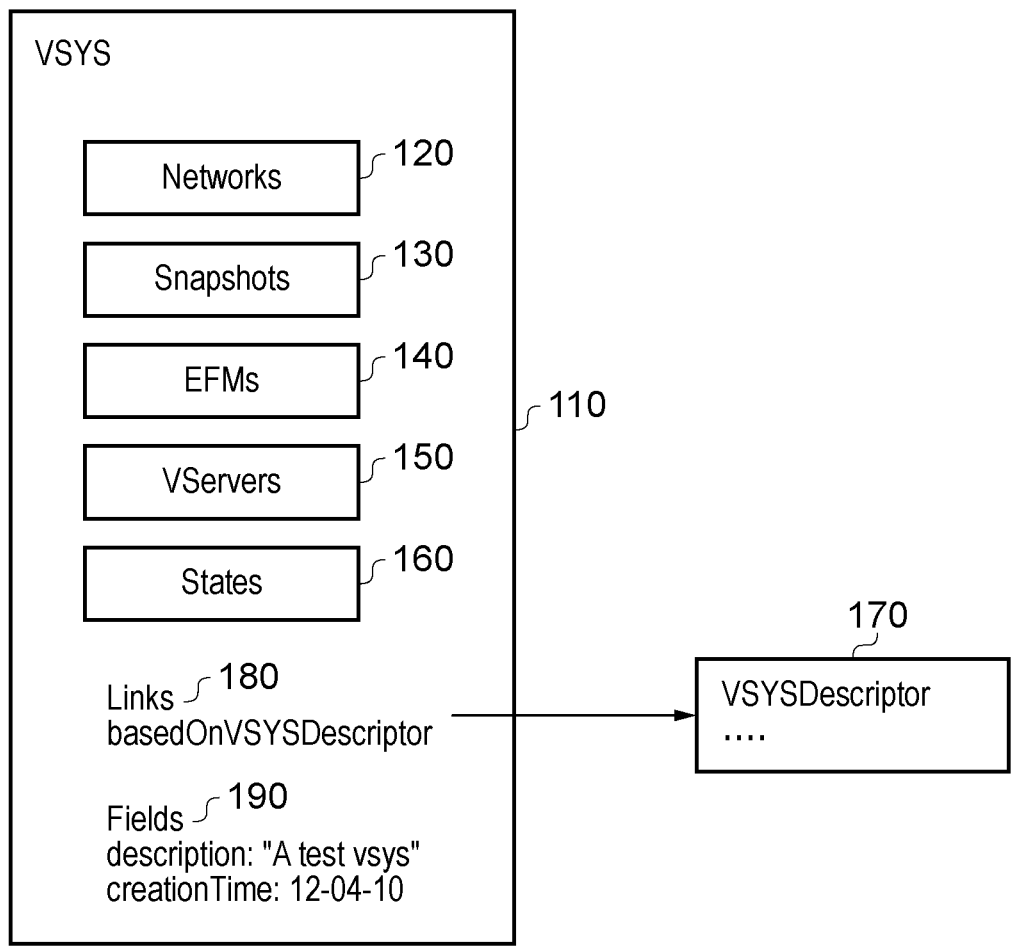
Figure 5D:
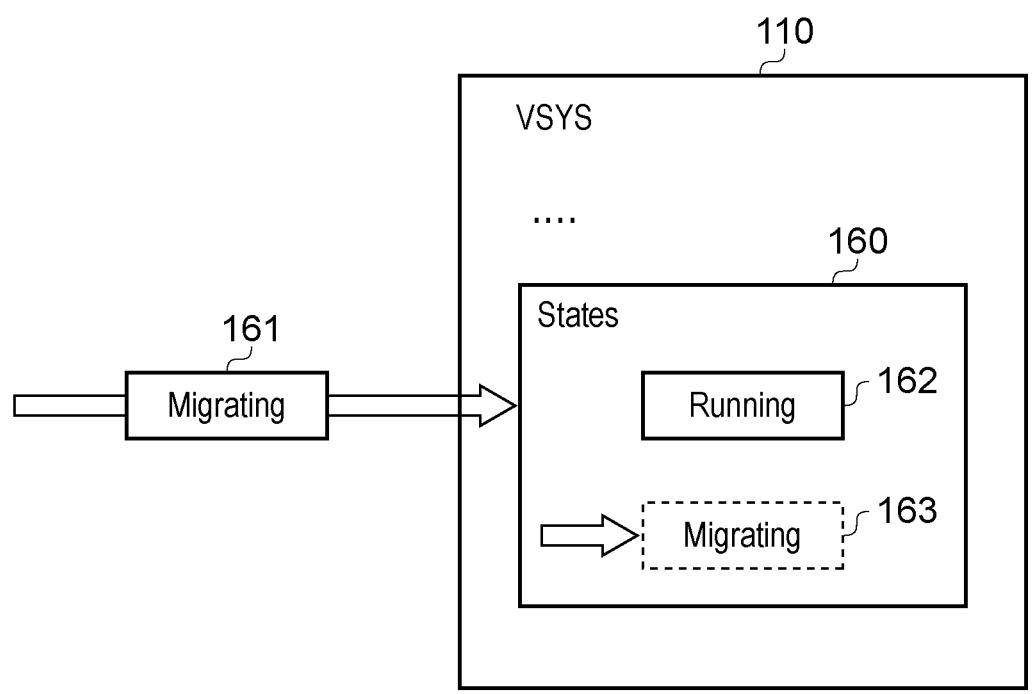
Figure 6:
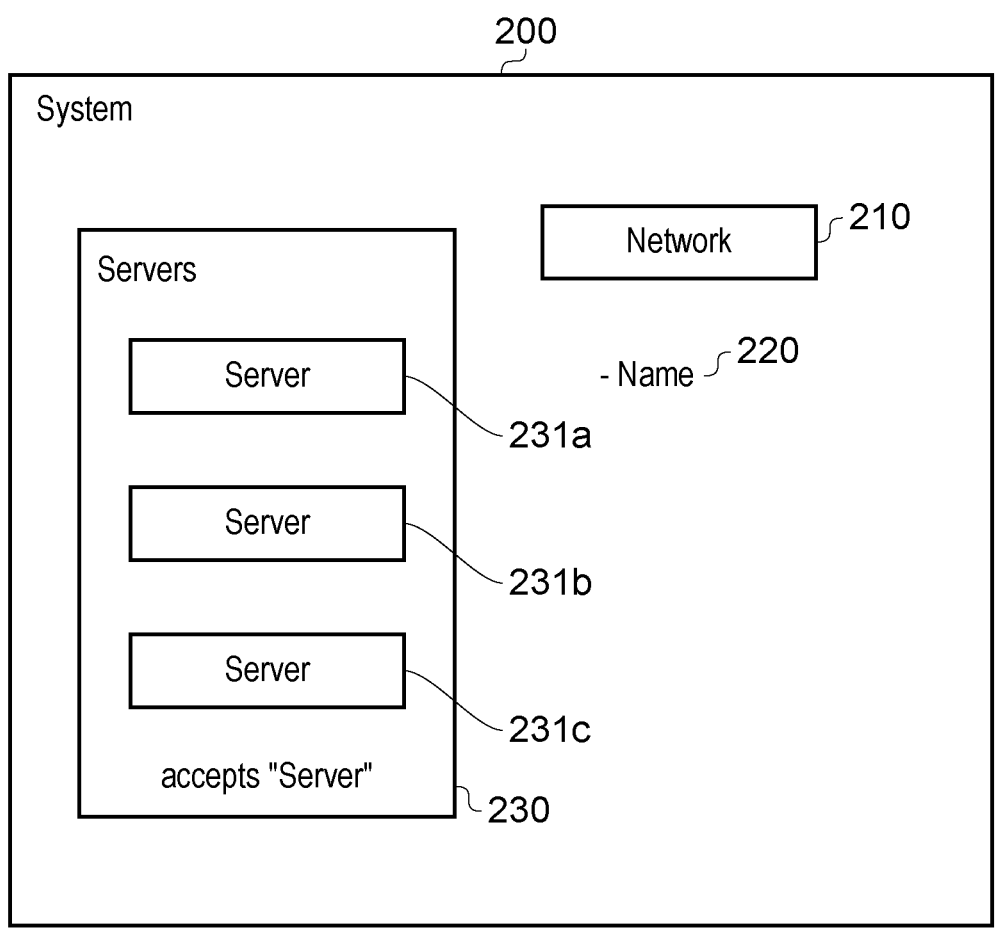

FIGS. 4A-C illustrate patterns regularly observed in domain ontologies;

FIG. 5A is a schematic of a group of virtual systems in an embodiment in which the present invention is applied to the virtual computing domain;

FIG. 5B is a schematic of a post operation being performed on a group of virtual systems in an embodiment in which the present invention is applied to the virtual computing domain;

FIG. 5C is a schematic of a single virtual system resource in an embodiment in which the present invention is applied to the virtual computing domain;

FIG. 5D is a schematic of a new state being posted to the States progenitor item in a virtual system resource in an embodiment in which the present invention is applied to the virtual computing domain;

FIG. 6 is a schematic of a System resource exemplifying the data structure in embodiments of the present invention.

Figure 7A:
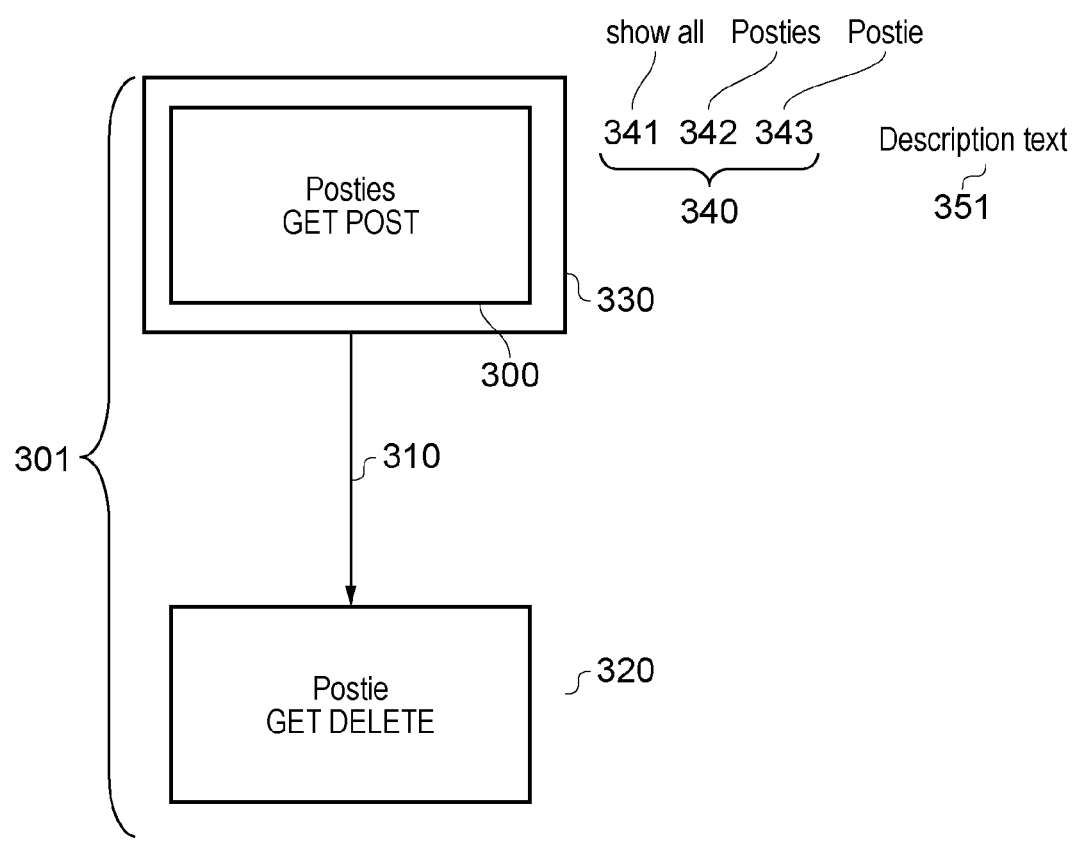
Figure 7B:
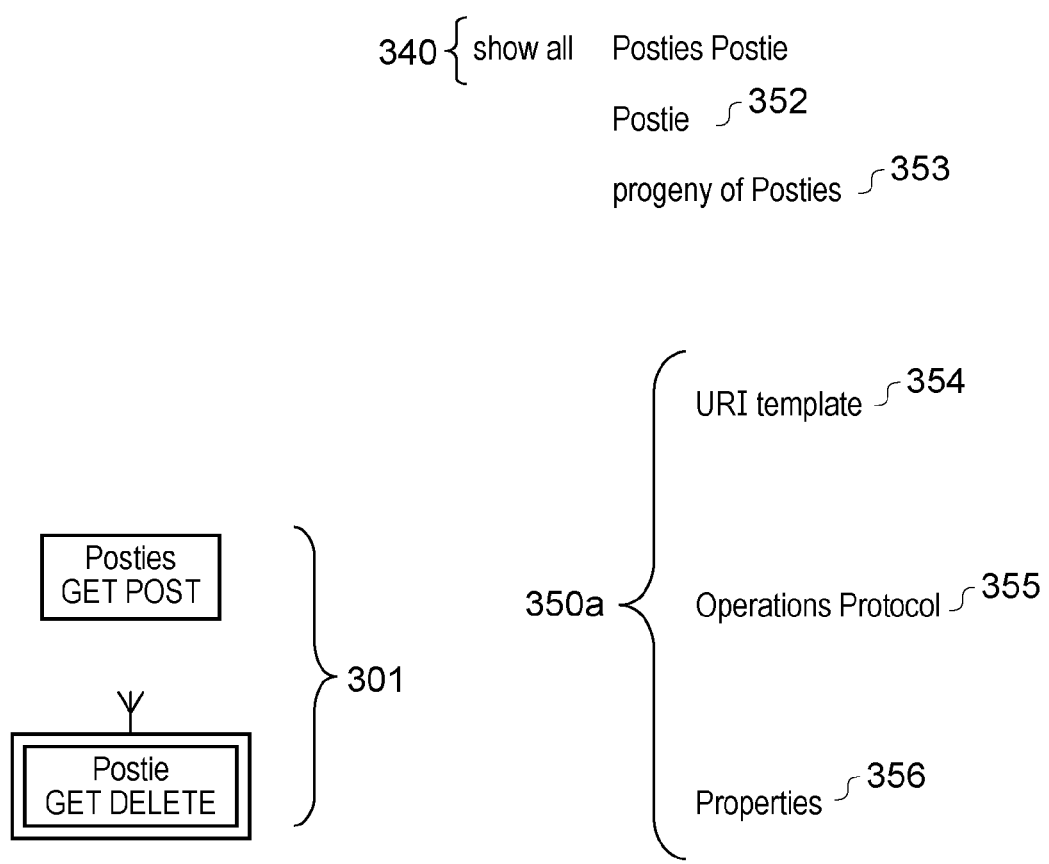
Figure 7C:
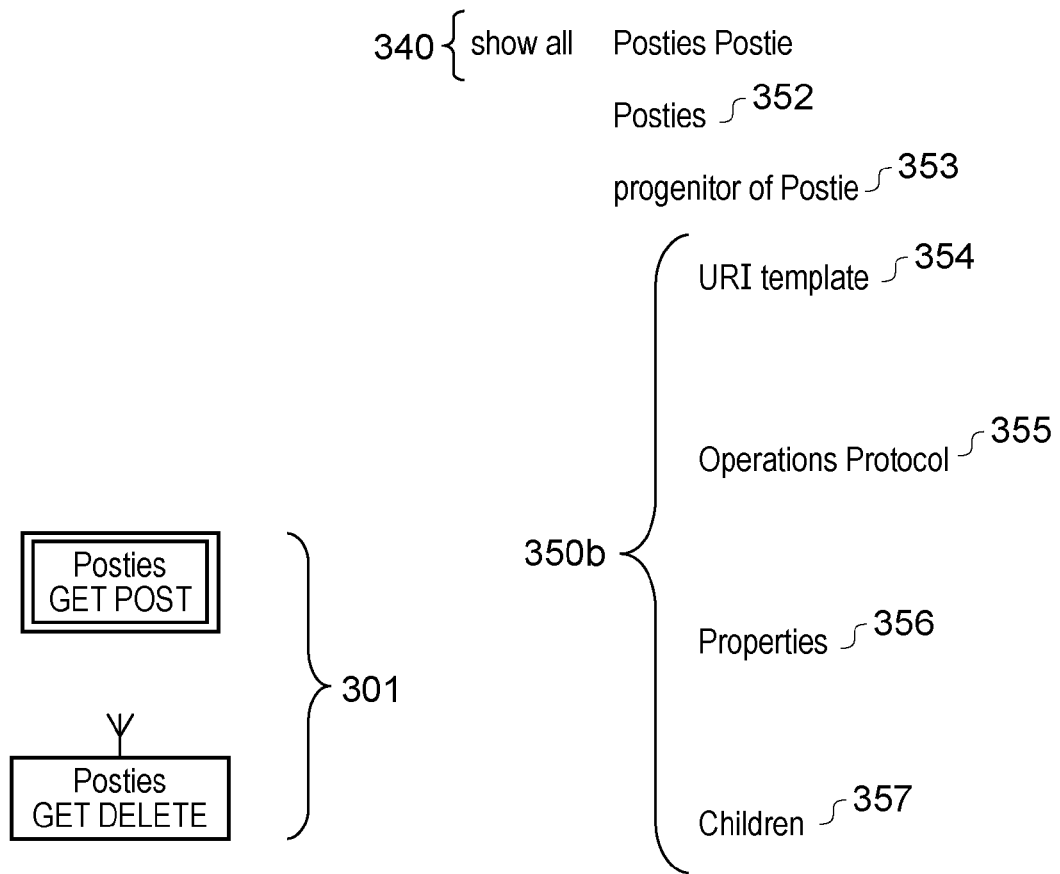

FIG. 7A is an example of a whole domain display output by a computer program embodying the present invention;

FIG. 7B is an example of a progeny class display output by a computer program embodying the present invention;

FIG. 7C is an example of a progenitor class display output by a computer program embodying the present invention;

FIG. 8A is a detail view of the specification section of the progeny class display; and FIG. 8B is a detail view of the specification section of the progenitor class display.

Figure 1:
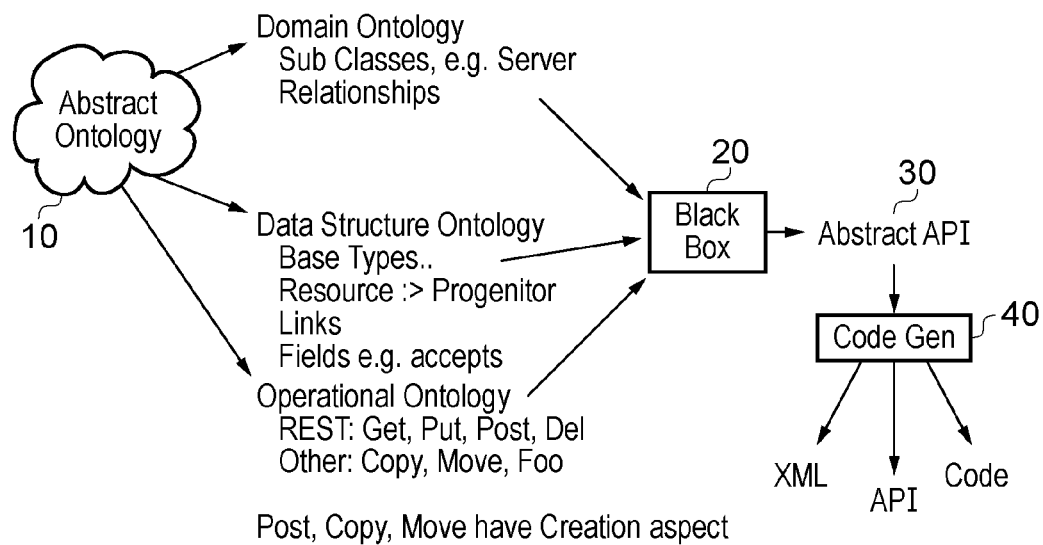
FIG. 1 is a conceptual map of an approach to producing APIs embodying the present invention.

FIG. 1 is a conceptual map of the approach used in a method embodying the present invention. The abstract ontology 10 does not exist in any addressable form, but is the generalised concept of an ontology (an ontology being 'what exists'). The arrows extending from the abstract ontology 10 represent the idea that in order to move from the abstraction of ontology to an actual ontology (which could define, for example, a domain), three aspects can be considered: a domain ontology, a data structure ontology, and an operational ontology. In other words, what is present in any domain is extended by the methods embodying the present invention, and can be thought of in terms of a domain ontology, a data structure ontology, and an operational ontology. The domain ontology is the domain-specific language, items, and relationships, which may be described in some readable or usable form by a domain description. Optionally, it is the domain-specific information that is input by a user. In particular, the domain ontology may describe items within a domain as classes of items and sub-classes of items, which classes and sub-classes are related, and the nature of those relationships.

The operational ontology and data structure ontology are domain-independent aspects which define generic relationships, rules, and assumptions for all domains. Components of the data structure ontology and operational ontology can be considered to be templates for building blocks that can be used to provide a complete information model for an extended domain.

The data structure ontology may include the categorisation of relationships (links) between classes of items into 'contains', 'accepts', and 'other'. That is to say, a relationship between class of items A and class of items B may be categorised as 'contains', i.e. meaning that A contains B. In a domain, item a (belonging to class A), and item b (belonging to class B), if linked, can be linked via the relationship 'a contains b'. In other words, class A is a container which may contain items of class B. It may also be true to say that class of items A is linked to class of items B via a relationship categorised as 'accepts', and therefore that in the domain, item a can accept item b. In other words, an item of class A can accept an item of class B.

Components of the data structure ontology may be properties which include simple data items which are exposed on a class of item, referred to as 'slots'. Exposed in this sense means the data item that is in the slot is accessible by a client, either to edit, an 'editable slot', or just to gain a representation, a 'read only slot'.

Other components of the data structure ontology may be:
  a list of which HTTP methods are allowed on a class of items;
  the representation of a resource returned when an HTTP GET operation is performed on the resource
  the entity which is responsible for creating new instances of a particular resource, this may be a resource that can validly receive a POST operation request for the resource being created (a valid receiver is of class Progenitor as well as Collection, inferencing reveals that such a valid receiver fits into the data structure ontology as a Progenitor);
  generically, how the server should process operations which have the effect of creating a new resource in a Container;
  which resources are deletable;
  which resources are manageable.

The operational ontology provides a core domain-independent list of methods, such as GET, POST, DELETE, and PUT, and processing rules for how these should be handled by a server. Optionally, the operational ontology may include additional methods or operations which are not applied to domain descriptions as a matter of course, but may be used where required for particular domains. However, it is implicit in embodiments of the invention consistent with the principles of the REST architectural style that operations GET, POST, DELETE, and PUT are included in the operational ontology. The operational ontology may be extended with more operations, however it is desirable to keep the number of different operations to a minimum.

The data structure ontology and operational ontology are applied to the domain ontology in the black box. The black box performs the role of a processing engine, taking in the aspects of the ontology and generating an interface specification (abstract API 30). The procedure within the black box can be automated, however it is also possible that user input is required at certain stages. The mechanism occurring within the black box of applying the domain-independent data structure and operational ontologies to the domain ontology is a technical process involving one or more of the following:
  an inference operation to infer additional information about the domain based on the domain ontology and inference rules derivable from the domain-independent data structure and operational ontologies—the additional information not being explicitly given in the domain ontology but derivable therefrom;

reasoning from the properties expressed in the domain ontology to compute membership criteria of classes of items designated as collections;

using class equivalence properties the black box computes class equivalences for each class of items in the domain. This allows the black box to infer, for example, that a class is a Progenitor class. The black box then knows to follow particular patterns when generating output such as an interface specification and other code artefacts;

the construction of a view of each class, including computing which 'slots' are present in each class of item. For each class of item, an enumeration of associated properties is computed. For properties inherited from super-class properties (ie class A has property X and class A1 is a sub-class of A so class A1 inherits property X) the most derived properties only are selected.

Part of the process of applying the domain-independent operational and data structure ontologies to the domain ontology within the black box can be described as a recursive process in which:

for each class of item in the domain ontology, associate operations having a creation aspect (Post, Copy, Move) with the class if the class is a Progenitor class, or associate non-creation operations (Get, Put and Delete) with non-Progenitor items;

if the class of item is a Progenitor class, then for each operation with a creation aspect, identify any criteria associated with when the Progenitor will accept the operation; and define an argument type associated with the operation which contains information needed to create the progeny item of the Progenitor in question.

The code generator 40 is an optional inclusion in invention embodiments and can produce one or more of XML code, an API, or other software artefacts based on the interface specification (abstract API 30) produced by the black box 20.

Figure 2:
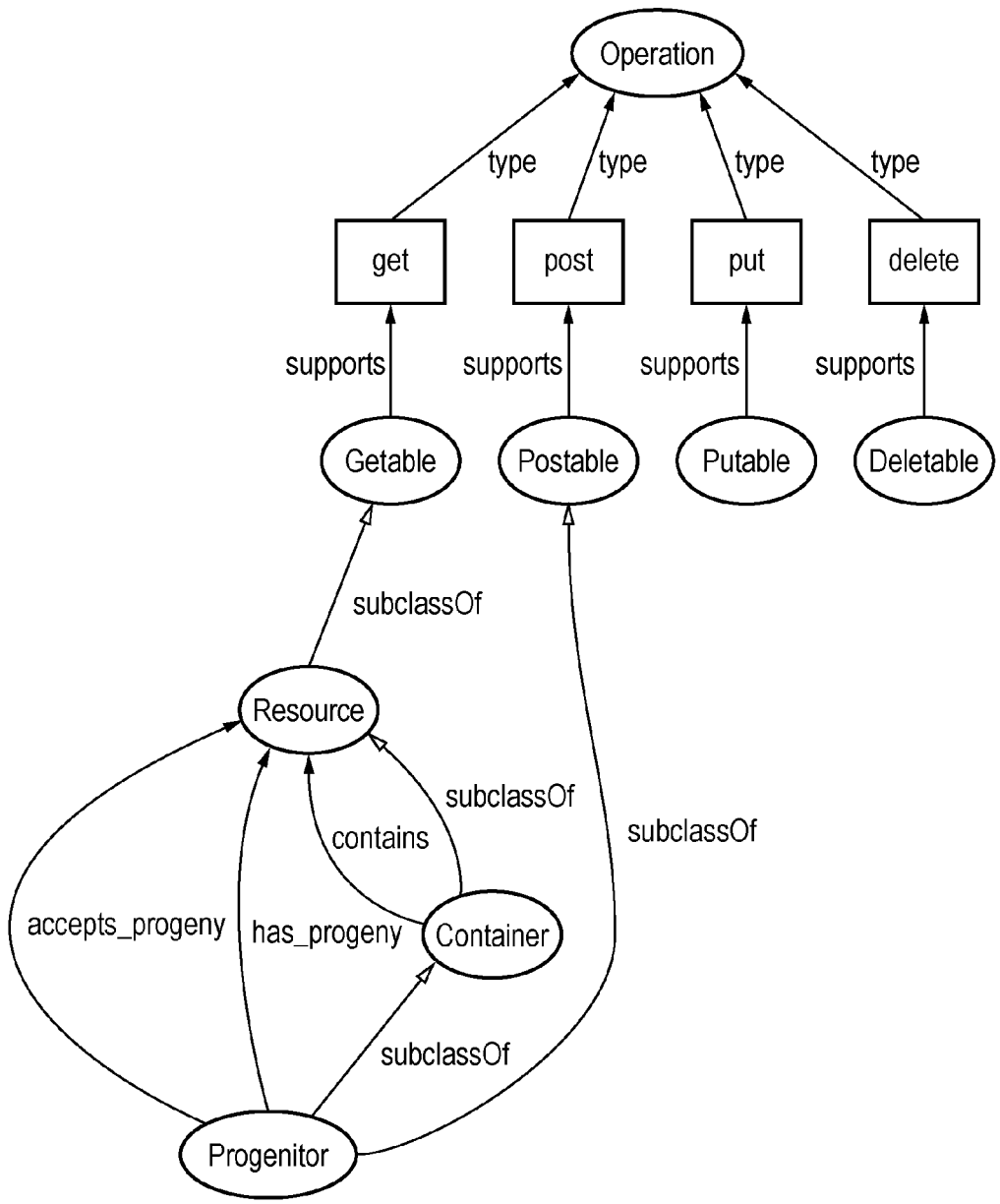
FIG. 2 is a diagrammatic representation of operations, types of classes, and the links between them.

FIG. 2 is a diagram illustrating the relationships between types of classes and the operations they support. In FIG. 2 classes are given elliptical outlines and instances rectangular. The arrows represent links between classes or between classes and operations, with the words categorising the type of relationship.

It can be seen from FIG. 2 that there is a class 'Operation'. The types of operation are 'get', 'post', 'put', and 'delete'. A class 'Getable' supports operations of type 'get', that is, items belonging to the class 'Getable' can have the 'get' operation performed on them. There is a class 'Postable' that supports the 'post' operation in an equivalent way to the way in which the class 'Getable' supports the 'get' operation. Similarly, a class 'Putable' supports the 'put' operation, and 'Deletable' supports the 'delete' operation.

'Resource' is a subclass of 'Getable'. That is to say, a 'resource', an item belonging to the class 'Resource', is inherently 'Getable' since it inherits the property of supporting the operation 'get' from its super-class, 'Getable'. A class 'Container' is provided which is a sub-class of Resource, and hence inherits the property of supporting the operation 'get' from its super-class, 'Resource'. Items belonging to the class 'Container' can be linked to items belonging to the class 'Resource' by a 'contains' relationship. That is to say, a container item can contain a resource item.

The class 'Progenitor' is a sub-class of the class 'Container', and hence also inherits the property of supporting the operation 'get'. The class 'Progenitor' is also a subclass of the class 'Postable', and hence inherits the property of supporting the operation 'post'. It is these two sub-class relationships of the class Progenitor that mean that an item of the class 'Progenitor' can also be called a 'Postable Container'. The 'Progenitor' class has a special relationship with the 'Resource' class, in that it can contain a resource item only if the resource item is a type of resource or subclass of resource that is defined as the progeny item for that progenitor item. The relationship is then a has_progeny relationship, so the progenitor has the resource as a progeny. The processing rules governing this relationship are distinct from those governing a contains link. Furthermore, the class 'Progenitor' is linked to the class 'Resource' via a relationship denoted as 'accepts_progeny'. This relationship denotes that a progenitor item can accept a post operation requesting that a resource item (of a specific type or subclass) be posted to the progenitor item, in response to which the progenitor item can create an instance of the type of resource item in question as a progeny item.

The class Resource supports the HTTP operations GET, DELETE, and PUT, as does the class Container. The class Progenitor supports the HTTP operation GET, DELETE, PUT, and POST.

Figure 3:
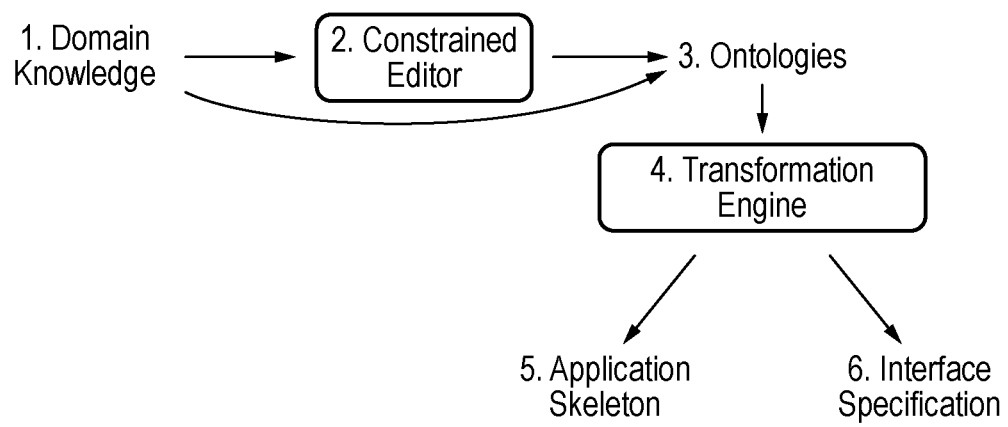
FIG. 3 illustrates a process embodying the present invention.

FIG. 3 is a diagram representing the process of turning domain specific knowledge 1 into an interface specification 6 and the intermediate stages. Initially, domain knowledge 1 is manipulated into ontologies 3. The difference between the domain knowledge 1 and the ontologies 3 is effectively that the ontologies 3 capture the domain knowledge 1 and present it in a way consistent with a domain independent data structure and operation structure. The transformation engine 4 (which incorporates the black box 20, and the Code Gen 40 of FIG. 1) can apply a set of rules derived from the data structure ontology and operational ontology to the ontologies 3 to produce an application skeleton 5 and interface specification 6. The process of forming ontologies 3 from domain knowledge 1 can also be used to ensure that there is sufficient domain knowledge 1 to produce an interface specification 6.

The process of producing ontologies 3 from domain knowledge 1 may be performed using a constrained editor 2. The domain knowledge may include class definitions and the way of describing links between the classes, including properties of the links. The ontologies 3 are consistent with the domain independent data structure and operation structure, in fact, the ontologies 3 may be a domain ontology, a data structure ontology, and an operational ontology (as illustrated in FIG. 1). That is to say, the classes of items in the domain and the relationships between them, and the operations they support, are based on the data structure and operation structure exemplified in FIG. 2, and/or the structures described as data structure ontology and operational ontology in relation to FIG. 1.

Formally, the ontologies 3 may be unified and presented in OWL (the Web Ontology Language). The constrained editor 2 is an editing environment which allows a user to produce ontologies 3 in some documented format, for example as an OWL document, without needing to know how to formally construct an ontology document. The constrained editor 2 may include a graphical interface in which domain knowledge can be applied to a set of fundamental classes that effectively form building blocks. The constrained editor can coerce a user into producing ontologies 3 consistent with the domain-independent data structure and/or operation structure, or may even enforce that ontologies 3 are produced that way. Though the ontologies 3 are conceptually distinct (having domain-independent and domain-dependent ontologies), they may be presented as a single document unifying the ontologies, or as numerous pieces of information resulting from the combination of domain-independent and domain-dependent ontologies.

Universal interaction semantics and modelling patterns are captured in the domain-independent data structure and operation structure (these can also be referred to collectively as a core ontology, or general ontology). Producing the ontologies 3 for a particular domain may include importing and making reference to the data structure and operation structure. The step from ontologies 3 to an implementable interface specification 6 and other artefacts 5 (bits of server-side implementation code) may be an automated process taking place within a transformation engine 4.

Interaction semantics can be thought of as rules dictating how the overall runtime state of a domain can be changed (via an interface of API implementing the interface specification). The runtime state of a domain can be represented by a graph (for example, a map of resources and links between the resources). The universal interaction semantics capture what a client can do to change the shape of the graph in general terms, these can then be applied to a specific domain, for example, by the constrained editor 2. Examples of interaction semantics include indicating which classes can be deleted, and how a new resource can be added.

The constrained editor 2 may be realised as a graphical editor which can encode and represent the restrictions and patterns of the domain-independent data structure and operation structure. The domain knowledge of a user being captured in the ontology 3 then follows the conventions of the data structure and operation structure.

Users employing the constrained editor 2 are effectively insulated from the complexities of producing an ontology document representing the domain using a language such as OWL. If bypassing the constrained editor a user must themselves ensure that the constraints of the data structure and operation structure are adhered to.

The process of transformation by the transformation engine 4 may produce the code of an application skeleton as well as an interface specification. An application skeleton can be used as a starting point towards a functioning implementation of the interface specification. The programming style of any such implementation is event-driven, with event handlers attached to the classes of the ontologies 3.

It may be useful to note here that domain is used in this application to represent a general type of environment, for example the cloud infrastructure domain. A particular provider's domain would be referred to as an environment, so that a domain is an abstraction of environment.

The establishment of a domain-independent data structure and operation structure is enabled by extracting patterns to be incorporated in the structure from re-occurring observations across differing domains. The data structure and operation structure formalise these patterns. Some significant patterns formalised in the data structure and operation structure will now be described.

In FIG. 4A the nature of classes and sub-classes is illustrated, and the properties accepts and contains are exemplified. In FIGS. 4A to 4C, rectangles indicate classes, and rounded boxes represent instances of classes. In FIG. 4A, B is a class, and sub-classes Bx and By belong to the class B. A is a class not illustrated in FIG. 4A, but item a is an instance of class A. Items b1 and b2 are instances of class By. The relationships between the objects in FIG. 4A are represented by the arrows and adjacent text. As previously stated, classes Bx and By are sub-classes of class B. Instances of class A accept items in the class Bx at this point in time. However, at an earlier point in time A accepted class By. Item a is an instance of class A and supports the operations (methods) GET and POST, that is to say, class A is a sub-class of getable and postable. Item a is a container which contains items b1 and b2, both of which are instances of class By. Items b1 and b2 support the operation GET, so are resources.

'Contains' is a property, a type of relationship between two items. The principle of containment demarcates the hierarchical structure inherent in a given domain. The property 'contains' should be applied to subclasses of the same domain, and the range of what item can contain what may be constrained further, depending on the domain in question. The use of 'contains' as a property indicates the containment characteristic of a relationship between two classes. A resource hosting a set of links to contained items (elements) is implicitly a container. In FIG. 4A, item a is a resource (it supports the operation GET) of the class A. The ontology of the domain (the domain in FIG. 4A being abstract) declares the 'contains' relationship between the class A, and types of resource it is able to contain. In this case, class A can contain resources with class B and its subclasses (though this is not derivable solely from FIG. 4A). Since item a supports both GET and POST, it is a progenitor item.

As well as being a collection of items, a container may also be able to accept new elements to the collection. Classifying that the container a supports POST, and is hence of the class Progenitor, specifies that instances of class A can accept items. A request is an entity, and a request is received by a progenitor via the POST operation. The request entity describes the resource to be entered into the collection in progenitor a. If accepted (there may be criteria applied to the accepts relationship), then a new actual resource is created and entered into the collection.

In some cases the acceptance policy (the criteria applied to request entities) can be restricted further at runtime, for example, based on environmental variables and states of resources. The contains policy, however, is a design-time restriction on what may appear as members inside the collection. For example, when the lifecycle of a 'manageable' resource is controlled through a collection of states associated with the resource, the 'states' collection is generally able to contain state resources (resources of the class State), and at a particular point in its lifecycle will be able to accept a StartState resource (a subclass of State) to 'start' it. The property 'accepts' can be used to publicise this runtime membership information for a given 'postable container' (progenitor) resource.

FIG. 4B illustrates the concept of a linking class. In FIG. 4B, item a is an instance of class A, and supports operations GET and POST. Item a is a progenitor item since it supports operations GET and POST. The item blink is an instance of a linking class. Item b is an instance of class B. Item a contains item blink, and blink is linked to item b.

Containment implies that there is an exclusivity to the relationship between two items from the perspective of contained resources. The model should be re-factored if it appears that two separate resources may logically contain the same particular resource. An approach to handle this situation is to introduce a 'linking' class. In the example illustrated in FIG. 4B, each blink resource is exclusively contained inside a single resource (with class A), with the result that the resource b (with class B) can be associated with multiple instances of class A.

FIG. 4C illustrates the concept of using an additional layer of containment to deal with a class declaring containment of non-homogenous elements. In FIG. 4C, item a is an instance of class A and supports the operation POST. Item b is an instance of class B and supports the operation POST. Item c is an instance of class C and supports the operation POST. Item a is a container that contains items b and c. Item c is a container that contains item c2, and item b is a container that contains items d1 and d2.

For a class declaring containment of non-homogenous items, the data structure and operation structure of the present invention may constrain the ontology to include in its hierarchy an additional set of container classes to ensure that the elements inside a container are homogenous. This is advantageous as instances of homogenous classes can be handled using common processing rules at runtime. The decision regarding the level of homogeneity to require in containers may be hard-wired into the data structure, or may be left to the user (application developer). Often a valid super class is used to specify valid entry into a container.

The data structure and operation structure formalise an approach to using these patterns in the information modelling space (ontology production process), which allows for operational-level software artefacts (i.e. HTTP-based APIs). The transformation from ontology to interface specification and other artefacts does require a number of internal processes, such as inferencing and reasoning, in order to build the interface specification (a set of rules are applied to the ontology).

FIGS. 5A to 5D exemplify how the approach to ontology production may be applied to the case of producing an ontology for a group of virtual systems.

VSYSs 100 is a progenitor item, its progeny items being VSYS 110a-c items. An HTTP GET operation to receive a representation of VSYSs 100 may return, for example, a list of the VSYS progeny items 110a-c contained in VSYSs 100. An HTTP delete operation performed on the VSYSs item 100 may remove all of the contained VSYS items 110a-c recursively and remove the VSYSs 100 item.

FIG. 5B illustrates an HTTP POST operation performed on the VSYSs item 100. A client application submits a request entity 111 using the HTTP POST operation to the VSYSs item 100. The body of the request entity 111 describes the progeny item (in this case a VSYS item) it would like to be created and contained within VSYSs 100. The server then creates a new VSYS item 110d inside the progenitor VSYSs 100 and assigns a URL to the new item. VSYSs 100 is a progenitor item having the constraint that its progeny items are those of the class VSYS.

In the context of the virtual computing domain for which the ontology represented by FIGS. 5A to 5D is generated, posting a new VSYS progeny item may, in real terms, create a virtual system in an already existing group of computing resources, which may be treated by the client application as a complete VSYS (virtual system).

FIG. 5C provides a framework for items of the class VSYS 110. VSYS 110 (virtual system) is a container item containing five progenitors, Networks 120, Snaphots 130, EFMs 140, VServers 150, and States 160. VSYS 110 also contains a list of links 180 to other items, which in the case of the VSYS 110 in FIG. 5C is a link to a VSYSDescriptor item, with the link characterised by a 'basedOn' clause. In addition, VSYS 110 contains a list of fields 190, which contain simple data objects, these fields can also be referred to as 'slots'. The fields may be editable or read-only. In this example, the 'creationTime' field is read-only, whereas the 'description' field is editable. In order to enable editing of the 'description' field, and edit link is published on the VSYS item 110. This edit link makes the fact that there is an editable field called 'description' available to a client application. An (HTTP) PUT operation can then be used to edit the field value.

FIG. 5D shows the States progenitor item 160 in detail. The States progenitor item 160 is contained by the VSYS container 110. The States progenitor item 160 is a resource for managing the state of the VSYS instance (item) 110 in which it is contained. The most recent state item to be added to the States progenitor item 160 was the 'Running' state 162. The States progenitor item 160 is constrained by only being able to accept requests to create items belonging to the class 'State'. The VSYS 110 is therefore in a state associated with the state item 'Running'. Two examples of items belonging to the class 'State' are 'Running' 162 and 'Migrating' 163. A POST operation can be performed on the States progenitor item 161 to create a new item of the class 'State' within the States progenitor item 160, and hence change the state of the VSYS item 110 containing the States progenitor item 160.

A client application can manage the state of the VSYS item 110 by submitting a request entity 161 to the States progenitor item 160 using the HTTP POST operation. The body of the request entity 161 describes the progeny item it would like to be created (in this case a 'Migrating' state item). The States progenitor item 160 accepts the request entity 161 and can create a new 'Migrating' state item 163 within the States progenitor item 160. Once the 'Migrating' state item 163 is created, the VSYS 110 will be in a migrating state. The 'Running' state item 162 is retained in the States progenitor item 160, so that by managing the state of the VSYS 110 in this way, a state history is maintained within the States progenitor item 160. The operational details of the new state may be hosted by the server, so that the request entity 161 can contain as little as a valid name of a new state. Optionally, asynchronous state management is assumed which supports non-instantaneous state changes.

FIG. 6 is an example of how a computing system in a cloud computing domain might be represented in accordance with the data structure. The System resource 200 contains a Network resource 210 (which is a link to a network), a Name field 220 (which is read-only), and a Servers progenitor item 230, containing Server resources 231a-c. The Servers progenitor item 230 will accept requests to POST new server items, and in response will create a new Server resource. Servers 230 may stop accepting requests to POST new servers when a predetermined limit on the number of servers has been reached.

FIGS. 7A-7C present representations of the display output by a computer program for performing the method of embodiments of the present invention. The domain being represented is a domain in which a client can add notes (Postie) to a collection on a server via a request. The server stores the notes in a collection (Posties).

The domain for which an ontology document and interface specification have been produced in FIGS. 7A to 7C is a simple domain in which two classes exist, Postie, and Posties. The domain knowledge in this example may be a presentation of simple facts describing the domain, such as: postie items can be stored in a posties container; a postie item can be deleted; a postie item is created within a posties container; and representations of both posties and postie can be returned to a client.

FIG. 7A represents a domain view, which is a root display for exploring the graphical domain ontology representation 301. This may have been derived from an OWL document or some other ontology document capturing some or all of the simple facts detailed above. The domain view representation 301 represents domain knowledge to which the data structure and operation structure of the present invention has been applied.

We note that the views depicted in FIGS. 7A to 7C represent final view of the interface specification, this exemplifies a possible form of output from either the code gen (code generator) 40 or the transformation engine 4.

A menu bar 340 contains links to other views of the domain ontology representation 301, focussing on specific classes or other elements. At the right hand side of the view a 'Description text' area 351 displays some text summarising the domain.

In the menu bar 340, a 'show all' button 341 links to the domain view displayed in FIG. 7A, a 'Posties' button links to the Posties view in FIG. 7C, and a 'Postie' button links to the Postie view in FIG. 7B. The menu bar 340 is accessible in all views.

In the domain view, a 'description text' area 351 is provided in which the user can provide an overall description of the domain. Depending on the process by which the domain ontology representation was produced, it may be that the computer program is able to derive the text for the description text area itself, based on the domain description input by the user at some earlier stage.

In this example, the description text 351 may be, for example: 'This is a simple example. There is a collection of posties containing individual posties. Posties is a progenitor, and is able to accept instructions to create a postie item.'

There are two classes of item in the domain ontology representation 301. Posties 300 is a progenitor supporting both the (HTTP) GET and POST operations. A highlighter 330 merely represents that Posties is currently selected, so that hitting the return key would move to the Posties view. An arrow 310 links Posties 300 to Postie 320, indicating that there is a relationship between the classes. Postie 320 as a class supports the (HTTP) operations GET and DELETE. The boxes for Posties 300 and Postie 320 may be used in a similar way to the menu bar to move between views.

FIG. 7B represents a Postie view, which is a class view of the class Postie. The domain ontology representation 301 is scaled-down, but contains the same information as in the domain view. Similarly, the menu bar 340 is the same as in the domain view.

A class header 352 and class sub-header 353 indicate the name for the class and a very brief summary of its role in the domain. The content of the sub-heading may be input by the user, or may be derived by the computer program from the domain description or ontology document. In this case, the class header 352 reads 'Postie', and the sub-header 353 reads 'progeny of Posties'. A specification section 350a displays outputs of the processing engine, which in this embodiment is part of the computer program. The outputs can be easily implemented as an API or other software artefact by a user.

A URI template area 354 provides a URI template for items of the class indicated by the class header 352 for the user. In this example, the URI template area 354 may include the text:

---

'URI template (this is a SUGGESTION only)
/Posties
/{Postie}'

---

The text 'Posties' may be a clickable link to the Posties view.

The Operations Protocol area 355 provides text to instruct a user on how to code the processing of a request of an HTTP operation for an item of the class indicated by the class header 352. In the present example, Postie as a class supports the HTTP operations GET and DELETE, so the operations protocol may read:

---

'Operations
GET <item url='..' class='Postie'>
    <date> dateTime </date>
    <text> string </text>
</item>
DELETE'.

---

That is to say, for the operation 'GET', the request does not require an argument (blank request), and the tagged text detailed above (from <item . . . to . . . /item>) represents the format of the response which would be generated by the server in response to the request. The response would include not only the string of the postie on which the GET operation is performed, but also a dateTime data object representing the creation time of the postie. Similarly, DELETE does not require an argument, neither does the server generate a response, hence there is no text pertaining to the DELETE operation.

The Properties area 356 provides text to instruct a user as to what properties each class has, and what simple data object these properties are. In the present example, the text might read:

---

'Properties (dot indicates read-only)
date•           dateTime
text            string'.

---

FIG. 7C represents a Posties view, which is a class view of the class Posties. The domain ontology representation 301 is scaled-down, but contains the same information as in the domain view. Similarly, the menu bar 340 is the same as in the domain view.

A class header 352 and class sub-header 353 indicate the name for the class and a very brief summary of its role in the domain. The content of the sub-heading may be input by the user, or may be derived by the computer program from the domain description or ontology document. In this case, the class header 352 reads 'Posties', and the sub-header 353 reads 'progenitor of Postie'. A specification section 350b displays outputs of the processing engine, which in this embodiment is part of the computer program. The outputs can be easily implemented as an API or other software artefact by a user.

A URI template area 354 provides a URI template for items of the class indicated by the class header 352 for the user. In this example, the URI template area 354 may include the text:

---

'URI template (this is a SUGGESTION only)
/Posties'.

---

The Operations Protocol area 355 provides text to instruct a user on how to code the processing of a request of an HTTP operation for an item of the class indicated by the class header 352. In the present example, Posties as a class supports the HTTP operations GET and POST, so the operations protocol may read:

---

'Operations
GET <item url='..' class='Posties'>
        <postie url='..' class='Postie' />
    </item>
POST creates a Postie child resource inside this collection
    <item class='Postie'>
        <text> string </text>
    </item>'.

Again, the GET operation does not require an argument, and the text following 'GET' (between <item . . . and . . . /item>) represents the format of response which would be generated by the server receiving a GET request for a Posties progenitor. The operation POST does have an argument (the string), and the text following 'POST' between <item . . . and . . . /item> is actually the format that a request to create a new postie via the POST operation should take (the string being the string of the postie). Optionally, text representing the format for a response to such a request could be displayed. However, it would be known by a user that the format of such a response is the same as that for the 'Postie' class detailed above, with a response of the form:

```
<item url='..' class='Postie'>
    <date> dateTime </date>
    <text> string </text>
</item>
``` being generated for each postie item in the Posties progenitor.

The Properties area 356 provides text to instruct a user as to what properties each class has, though in this case the progenitor item only contains Postie items and has no additional fields, so the Properties area 356 is blank.

An additional text area, the Children area 357, is provided since the class Posties is a progenitor class. The Children area 357 provides details of the classes for which the class indicated by the class header 352 is a progenitor. In this example the text may read:

```
'Progenitor of
   postie Postie'
```

In which the second piece of text, 'Postie', is a link to the Postie view.

FIGS. 8A and 8B provide detailed views of the specification sections 350a and 350b relating to classes Postie and Posties respectively. The class header 352 and class sub-header 353 areas are also displayed in each example.

The operations of the operational ontology may be HTTP operations, though this is optional.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

In particular, a computer program may be provided which, when executed by a computing device having a processor, causes the computing device to perform a method embodying the present invention.

What is claimed is:

1. A computer-implemented method for generating an ontology document indicating a structure of classes of items within a domain, which items belong to which class, and which operations each class supports, the method comprising:

inputting a domain description including information about items in the domain and relationships between the items; and accessing a data structure and an operation structure, wherein the data structure is a domain-independent model of items and relationships between items for characterizing items described in the domain description into classes; and the operation structure is a domain-independent list of operations which, when applied to a domain description, define processing rules for the classes of items, the operation structure including operations having a creation aspect;

the data structure comprising at least progenitor items as a class of items each able to contain only progeny items created by the progenitor item as a consequence of the progenitor item accepting an operation from the operation structure invoked against it;

the method further comprising:

applying the data structure and the operation structure to the domain description to generate an ontology document for use in producing a software artifact including identifying classes of items from the domain description that are progenitor items, and associating the operations having a creation aspect from the operation structure with the identified progenitor items from the domain description.

2. The computer-implemented method according to claim 1, wherein the domain description is input to a processing engine, the data structure and operation structure are accessed by the processing engine, the data structure and operation structure are applied to the domain description in the processing engine, and the ontology document is generated by the processing engine.

3. The computer-implemented method according to claim 1, in which each instance of progenitor item is only able to contain progeny items that are instances of a particular class of item.

4. The computer-implemented method according to claim 1, further comprising:

generating in a processing engine, and outputting from the processing engine, a URI template in accordance with the ontology document, whereby the URI template can be used to ensure that each instance of a resource in the domain at runtime is dereferencable via an HTTP URI, a resource being a generic term for a class of items having fields and links to other resources.

5. The computer-implemented method according to claim 1, in which the ontology document defines a class of manageable container, instances of the manageable container class containing a states progenitor item, the states progenitor item being a progenitor item able to contain only progeny items that are instances of a state class of items used for indicating one of a predefined list of operating states of the class of manageable container.

6. The computer-implemented method according to claim 1, wherein:

the data structure and operation structure are accessed via a constrained editor, the constrained editor being an editing environment for constraining the user into inputting the domain description in such a way that the data structure and operation structure are applied to the domain description.

7. The computer-implemented method according to claim 1, in which an interface specification produced using the ontology document is consistent with principles of interfaces in the REST architectural style.

8. A computer-implemented method for generating a software artifact, the method including the method for generating an ontology document according to claim 1, and further comprising:

in a processing engine, applying a set of rules based on the data structure and the operation structure to the ontology document to generate a software artifact.

9. The computer-implemented method according to claim 8, in which the data structure and the operation structure ensure that the software artifact generated is consistent with principles for interfaces in the REST architectural style.

10. The computer-implemented method according to claim 9, in which the ontology document defines a class of manageable container, instances of the manageable container class containing a states progenitor item, the states progenitor item being a progenitor item able to contain only progeny items that are instances of a state class of items used for indicating one of a predefined list of operating states of the class of manageable container, so that the operating state of an instance of the manageable container class at runtime is operable to be managed by adding an instance of the state class to the states progenitor item contained by the instance of the manageable container class.

11. The computer-implemented method according to claim 9, wherein the software artifact includes defined acceptance constraints which, at runtime, constrain the particular instances of progeny items that can be created by an instance of a progenitor item as a consequence of an operation invoked against it, the acceptance constraints being available to a client tool.

12. The computer-implemented method according to claim 9, wherein the domain is a cloud computing environment and the software artifact is an interface specification which can be implemented as an infrastructure as a service API, or the software artifact is an infrastructure as a service API.

13. The computer-implemented method according to claim 8, in which the ontology document defines a class of manageable container, instances of the manageable container class containing a states progenitor item, the states progenitor item being a progenitor item able to contain only progeny items that are instances of a state class of items used for indicating one of a predefined list of operating states of the class of manageable container, so that the operating state of an instance of the manageable container class at runtime is operable to be managed by adding an instance of the state class to the states progenitor item contained by the instance of the manageable container class.

14. The computer-implemented method according to claim 13, wherein the state of the instance of the manageable container class at runtime is indicated by the most recently added instance of the state class to the states progenitor item contained by the instance of the manageable container class, so that the progeny items contained by the states progenitor item are a state history of the instance of the manageable container class.

15. The computer-implemented method according to claim 14, in which instances of the manageable container class are virtual computing systems.

16. The computer-implemented method according to claim 14, wherein the software artifact includes defined acceptance constraints which, at runtime, constrain the particular instances of progeny items that can be created by an instance of a progenitor item as a consequence of an operation invoked against it, the acceptance constraints being available to a client tool.

17. The computer-implemented method according to claim 14, wherein the domain is a cloud computing environment and the software artifact is an interface specification which can be implemented as an infrastructure as a service API, or the software artifact is an infrastructure as a service API.

18. The computer-implemented method according to claim 13, in which instances of the manageable container class are virtual computing systems.

19. The computer-implemented method according to claim 18, wherein the software artifact includes defined acceptance constraints which, at runtime, constrain the particular instances of progeny items that can be created by an instance of a progenitor item as a consequence of an operation invoked against it, the acceptance constraints being available to a client tool.

20. The computer-implemented method according to claim 18, wherein the domain is a cloud computing environment and the software artifact is an interface specification which can be implemented as an infrastructure as a service API, or the software artifact is an infrastructure as a service API.

21. The computer-implemented method according to claim 13, wherein the software artifact includes defined acceptance constraints which, at runtime, constrain the particular instances of progeny items that can be created by an instance of a progenitor item as a consequence of an operation invoked against it, the acceptance constraints being available to a client tool.

22. The computer-implemented method according to claim 13, wherein the domain is a cloud computing environment and the software artifact is an interface specification which can be implemented as an infrastructure as a service API, or the software artifact is an infrastructure as a service API.

23. The computer-implemented method according to claim 8, wherein the software artifact includes defined acceptance constraints which, at runtime, constrain the particular instances of progeny items that can be created by an instance of a progenitor item as a consequence of an operation invoked against it, the acceptance constraints being available to a client tool.

24. The computer-implemented method according to claim 23, wherein the domain is a cloud computing environment and the software artifact is an interface specification which can be implemented as an infrastructure as a service API, or the software artifact is an infrastructure as a service API.

25. The computer-implemented method according to claim 8, wherein the domain is a cloud computing environment and the software artifact is an interface specification which can be implemented as an infrastructure as a service API, or the software artifact is an infrastructure as a service API.

26. A computing device configured to generate an ontology document indicating a structure of classes of items within a domain, which items belong to which class, and which operation each class supports, the computing device comprising:

an input module for inputting a domain description including information about items in the domain and relationships between the items; and an access module for accessing a data structure and an operation structure, wherein:

the data structure is a domain-independent model of items and relationships between items for characterizing items described in the domain description into classes; and the operation structure is a domain-independent list of operations which, when applied to a domain description, define processing rules for the classes of items, the operation structure including operations having a creation aspect;

the data structure comprising at least progenitor items as a class of items each able to contain only progeny items created by the progenitor item as a consequence of the progenitor item accepting an operation from the operation structure invoked against it; the computing device further comprising:

a generator for applying the data structure and the operation structure to the domain description to generate an ontology document for use in producing a software artifact including identifying classes of items from the domain description that are progenitor items, and associating the operations having a creation aspect from the operation structure with the identified progenitor items from the domain description.

* * * * *

UNITED STATES PATENT AND TRADEMARK OFFICE
CERTIFICATE OF CORRECTION

PATENT NO. : 8,898,103 B2
APPLICATION NO. : 13/182882
DATED : November 25, 2014
INVENTOR(S) : Roger Menday It is certified that error appears in the above-identified patent and that said Letters Patent is hereby corrected as shown below:

On the Title Page

Column 2, Item [56] (Other Publications), Line 5, delete "101616920.2." and insert -- 10161690.2. --, therefor.

On Page 2

Column 1, Item [56] (Other Publications), line 2, delete "Proccedings" and insert -- Proceedings --, therefor.

In the Claims

Column 22, line 22, in Claim 1, delete "artifact" and insert -- artifact, --, therefor.
Column 25, lines 24-25, in Claim 26, delete "artifact" and insert -- artifact, --, therefor.

Signed and Sealed this
Nineteenth Day of May, 2015

Michelle K. Lee
*Director of the United States Patent and Trademark Office*